United States Patent
Biswas et al.

(10) Patent No.: US 8,477,771 B2
(45) Date of Patent: Jul. 2, 2013

(54) SYSTEM AND METHOD FOR REMOTE MONITORING AND CONTROL OF NETWORK DEVICES

(75) Inventors: Sanjit Biswas, San Francisco, CA (US); John Bicket, San Francisco, CA (US)

(73) Assignee: Meraki Networks, Inc., San Francisco, CA (US)

( * ) Notice: Subject to any disclaimer, the term of this patent is extended or adjusted under 35 U.S.C. 154(b) by 1088 days.

(21) Appl. No.: 12/039,539

(22) Filed: Feb. 28, 2008

(65) Prior Publication Data

US 2008/0285575 A1 Nov. 20, 2008

Related U.S. Application Data

(60) Provisional application No. 60/892,443, filed on Mar. 1, 2007, provisional application No. 60/892,432, filed on Mar. 1, 2007, provisional application No. 60/892,437, filed on Mar. 1, 2007, provisional application No. 60/892,440, filed on Mar. 1, 2007, provisional application No. 60/892,449, filed on Mar. 1, 2007.

(51) Int. Cl.
*H04L 12/28* (2006.01)

(52) U.S. Cl.
USPC ........... 370/389; 370/392; 370/401; 370/409; 709/227

(58) Field of Classification Search
None
See application file for complete search history.

(56) References Cited

U.S. PATENT DOCUMENTS

| 5,796,739 | A | 8/1998 | Kim et al. |
| 6,049,602 | A * | 4/2000 | Foladare et al. ......... 379/265.04 |
| 6,704,301 | B2 | 3/2004 | Chari et al. |
| 6,728,232 | B2 | 4/2004 | Hasty et al. |
| 6,868,080 | B1 | 3/2005 | Umansky et al. |
| 6,917,626 | B1 * | 7/2005 | Duvvury ....................... 370/466 |
| 6,925,069 | B2 | 8/2005 | Koos, Jr. et al. |

(Continued)

FOREIGN PATENT DOCUMENTS

| EP | 1265397 A2 | 12/2002 |
| EP | 1473900 A2 | 11/2004 |

(Continued)

OTHER PUBLICATIONS

Bicket, John, et al. "Architecture and Evaluation of an Unplanned 802.11b Mesh Network", *MobiCom'05*, Aug. 28-Sep. 2, 2005, Cologne, Germany, pp. 1-12.

(Continued)

*Primary Examiner* — Faruk Hamza
*Assistant Examiner* — Tito Pham
(74) *Attorney, Agent, or Firm* — Blakely Sokoloff Taylor & Zafman LLP

(57) ABSTRACT

A managed network provides unique network addresses that are assigned to nodes such that no two nodes will have the same address in the managed network and such that each node will always have the same network address regardless of changing its location or changing the network to which it is joined. The nodes, communicating together, comprise a mesh network. Remote management and control of the nodes is possible from the host server, which is located outside of the mesh network, even if a node is located behind a firewall or network address translator (NAT), because server management messages are encapsulated within headers so that a persistent connection between the node and the external host server is maintained once the node sends a message to the host.

31 Claims, 5 Drawing Sheets

U.S. PATENT DOCUMENTS

| | | |
|---|---|---|
| 7,016,328 B2 | 3/2006 | Chari et al. |
| 7,444,158 B2 | 10/2008 | Shitama et al. |
| 7,508,799 B2 | 3/2009 | Sumner et al. |
| 7,526,538 B2 | 4/2009 | Wilson |
| 7,554,959 B1 | 6/2009 | Dowling |
| 7,562,393 B2 | 7/2009 | Buddhikot et al. |
| 7,583,695 B2 | 9/2009 | Vimpari et al. |
| 7,590,733 B2 | 9/2009 | Lum |
| 7,630,341 B2 | 12/2009 | Buddhikot et al. |
| 7,650,148 B2 | 1/2010 | Kim et al. |
| 7,729,314 B2 | 6/2010 | Siddiqi et al. |
| 7,881,267 B2 | 2/2011 | Crosswy et al. |
| 2001/0024953 A1 | 9/2001 | Balogh |
| 2002/0006788 A1 | 1/2002 | Knutsson et al. |
| 2002/0141390 A1* | 10/2002 | Fangman et al. ............. 370/352 |
| 2003/0084162 A1* | 5/2003 | Johnson et al. ............... 709/227 |
| 2003/0095520 A1 | 5/2003 | Aalbers et al. |
| 2003/0142641 A1 | 7/2003 | Sumner et al. |
| 2003/0169713 A1 | 9/2003 | Luo |
| 2003/0179750 A1 | 9/2003 | Hasty et al. |
| 2004/0141522 A1 | 7/2004 | Texerman et al. |
| 2004/0253970 A1 | 12/2004 | Kunihiro |
| 2004/0264395 A1 | 12/2004 | Rao |
| 2005/0059396 A1 | 3/2005 | Chuah et al. |
| 2005/0060364 A1 | 3/2005 | Kushwaha et al. |
| 2005/0229238 A1 | 10/2005 | Ollis et al. |
| 2005/0246769 A1 | 11/2005 | Bao et al. |
| 2005/0259598 A1 | 11/2005 | Griffin et al. |
| 2006/0009246 A1 | 1/2006 | Marinier et al. |
| 2006/0014562 A1 | 1/2006 | Syrtsov et al. |
| 2006/0015579 A1 | 1/2006 | Sastri et al. |
| 2006/0053216 A1 | 3/2006 | Deokar et al. |
| 2006/0089964 A1 | 4/2006 | Pandey et al. |
| 2006/0155833 A1 | 7/2006 | Matsuda et al. |
| 2006/0187873 A1 | 8/2006 | Friday et al. |
| 2006/0200543 A1 | 9/2006 | Kong et al. |
| 2006/0209714 A1 | 9/2006 | Ackermann-Markes et al. |
| 2006/0291443 A1 | 12/2006 | Harrington et al. |
| 2007/0002833 A1 | 1/2007 | Bajic |
| 2007/0019631 A1 | 1/2007 | Jang |
| 2007/0064661 A1 | 3/2007 | Sood et al. |
| 2007/0156813 A1 | 7/2007 | Galvez et al. |
| 2007/0253344 A1 | 11/2007 | Frost et al. |
| 2007/0276926 A1 | 11/2007 | LaJoie et al. |
| 2007/0286393 A1 | 12/2007 | Roever et al. |
| 2008/0095180 A1 | 4/2008 | Vucina et al. |
| 2008/0205415 A1 | 8/2008 | Morales |
| 2008/0225806 A1 | 9/2008 | Arian et al. |
| 2009/0176509 A1 | 7/2009 | Davis et al. |
| 2010/0260061 A1* | 10/2010 | Bojahra et al. ................ 370/252 |
| 2010/0265845 A1 | 10/2010 | Lampen |
| 2011/0029644 A1* | 2/2011 | Gelvin et al. ................ 709/220 |

FOREIGN PATENT DOCUMENTS

| | | |
|---|---|---|
| WO | WO03/079709 A1 | 9/2003 |
| WO | WO2006/046261 A | 5/2006 |
| WO | WO2006/121465 A1 | 11/2006 |

OTHER PUBLICATIONS

Buddhikot, M.M., et al. "Integration of Wireless LAN and 3G Wireless—Design and Implementation of a WLAN/CDMA2000 Interworking Architecture", *IEEE Communications Magazine* (Nov. 2003) vol. 41(11):99-100.

Caltech and Partners: "Application Monitoring API" [Online] Dec. 23, 2005, pp. 1-2, retrieved from the Internet at URL:http//monalisa.cacr.caltech.edu/monalisa_Service_Applications_ApMon.html> on Jul. 29, 2008.

"Changing Your MAC Address in Window XP/Vista, Linux and Mac OS X (Sometimes known as MAC spoofing)", retrieved from the Internet on Feb. 27, 2007 at [http://www.irongeek.com/i.php?page=security/changemac&mode=print], pp. 1-4.

Comer, D. *Internetworking with TCP/IP* (1995), Prentice Hall, USA, pp. 61-62, paragraph 4.5.

Congdon, P.(Hewlet Packard Company), et al. "IEEE 802.1X Remote Authentication Dial in User Service (RADIUS) Usage Guidelines", *IEFT Standard, Internet Engineering Task Force* (Sep. 2003) pp. 1-30.

Griffiths, Rob "Set newer portable Macs' sleep mode", posted at Macworld: MAC OS X Hints, on Oct. 19, 2006, retrieved from the Internet on Feb. 27, 2007 at [http://www.macworld.com/weblogs/macosxhints/2006/10/sleepmode/index.php?pf=1].

Konstantinou, A., "NetCallback 1.3.1 Forwarding TCP and UDP ports behind a firewall" [Online] 2001, pp. 1-5, retrieved from the Internet at URL:http://netcallback.sourceforge.net/> on Jul. 29, 2008.

Krag, Thomas, et al. "Wireless Mesh Networking", posted at Wireless DevCenter on Jan. 22, 2004, retrieved from the Internet at [http://www.oreillynet.com/lpt/a/4535] on Feb. 27, 2007, pp. 1-9.

"No Internet With New Router, Computer, or Adapter: MAC Spoofing", posted at Netgear, retrieved from the Internet on Feb. 27, 2007 at [http://kbserver.netgear.com/kb_web_files/n101227.asp], p. 1.

Roch, Stephane "Nortel's Wireless Mesh Network solution: Pushing the boundaries of traditional WLAN technology", *Nortel Technical Journal* (Jul. 2005) Issue 2, pp. 18-23.

"The Linksys BEFSR41 Etherfast Cable/DLS Router", posted at *Network Lab—A Guide to Networking an NTL Cable Modem*, retrieved from the Internet on Feb. 27, 2007 at [http://www.networklab.co.uk/cmodem/linksys.html].

Wang, et al. "Global Connectivity for Mobile IPv6-based Ad Hoc Networks", *Proceedings of the 19th International Conference on Advanced Information Networking and Applications (AINA'05)* (Mar. 2005), vol. 2:2:807-812.

RFC 2131, Dynamic Host Configuration Protocol, Mar. 1997, retrieved from the internet <tools.ietf.org/pdf/rfc2131.pdf>, pp. 1-46.

Final Office Action, U.S. Appl. No. 12/039,557, dated Aug. 14, 2012, 16 pages.

Notice of Allowance, U.S. Appl. No. 12/039,520, dated Sep. 4, 2012, 10 pages.

Final Office Action, U.S. Appl. No. 12/039,520, dated Apr. 12, 2012, 20 pages.

International Preliminary Report on Patentability, Application No. PCT/US2008/055419, dated Sep. 1, 2009, 7 pages.

International Search Report and Written Opinion, Application No. PCT/US2008/055419, dated Aug. 12, 2008, 9 pages.

International Preliminary Report on Patentability, Application No. PCT/US2008/055414, dated Sep. 1, 2009, 12 pages.

International Search Report and Written Opinion, Application No. PCT/US2008/055414, dated Oct. 14, 2008, 15 pages.

International Preliminary Report on Patentability, Application No. PCT/US2008/055415, dated Sep. 1, 2009, 7 pages.

International Search Report and Written Opinion, Application No. PCT/US2008/055415, dated Sep. 3, 2008, 9 pages.

International Preliminary Report on Patentability, Application No. PCT/US2008/055416, dated Sep. 1, 2009, 6 pages.

International Search Report and Written Opinion, Application No. PCT/US2008/055416, dated Jul. 28, 2008, 7 pages.

International Preliminary Report on Patentability, Application No. PCT/US2008/055424, dated Sep. 1, 2009, 7 pages.

International Search Report and Written Opinion, Application No. PCT/US2008/055424, dated Aug. 19, 2008, 9 pages.

Final Office Action, U.S. Appl. No. 12/039,509, dated Jan. 4, 2011, 15 pages.

Non-Final Office Action, U.S. Appl. No. 12/039,509, dated Jun. 1, 2010, 12 pages.

Non-Final Office Action, U.S. Appl. No. 12/039,530, dated Sep. 1, 2009, 16 pages.

Notice of Allowance, U.S. Appl. No. 12/039,530, dated Jun. 22, 2010, 8 pages.

Notice of Allowance, U.S. Appl. No. 12/039,530, dated Aug. 5, 2010, 8 pages.

Non-Final Office Action, U.S. Appl. No. 12/039,557, dated Sep. 1, 2010, 18 pages.

Non-Final Office Action, U.S. Appl. No. 12/039,557, dated Jan. 5, 2012, 19 pages.

Final Office Action, U.S. Appl. No. 12/039,557, dated May 25, 2011, 14 pages.

Non-Final Office Action, U.S. Appl. No. 12/039,520, dated Aug. 17, 2011, 22 pages.
Final Office Action, U.S. Appl. No. 12/039,520, dated Feb. 1, 2011, 22 pages.

Non-Final Office Action, U.S. Appl. No. 12/039,520, dated Jun. 25, 2010, 19 pages.

* cited by examiner

SYSTEM AND METHOD FOR REMOTE MONITORING AND CONTROL OF NETWORK DEVICES

CROSS-REFERENCES TO RELATED APPLICATIONS

This application claims the benefit of U.S. Provisional Application Ser. No. 60/892,443 entitled "System and Method for Remote monitoring And Control of Network Devices", by Thomer M. Gil, et al., filed Mar. 1, 2007, and the benefit of the following U.S. Provisional Applications: entitled "System and Method for Hosted Network Management", by S. Biswas, et al., Ser. No. 60/892,432, filed Mar. 1, 2007; entitled "Node Self-Configuration and Operation in a Wireless Network," by S. Biswas, et al., Ser. No. 60/892,437; entitled "Client Operation for Network Access," by T. Gil, et al., Ser. No. 60/892,440 filed Mar. 1, 2007; entitled "Client Addressing and Roaming in a Wireless Network," by T. Gil et al., Ser. No. 60/892,449, filed Mar. 1, 2007; "Client Operation for Network Access" by Thomer M. Gil et al. filed Mar. 1, 2007; Priority of the filing dates is hereby claimed, and the disclosures of the Provisional Applications are hereby incorporated by reference.

BACKGROUND

Wireless mesh networks include at least one node that connects to a wide area network (WAN) and one or more wireless access points comprising nodes of the mesh network that communicate with each other, at least one of which communicates with the wide area network node. The WAN can comprise, for example, the Internet, and the WAN node typically comprises a cable interface (cable modem) or DSL interface or the like, and the wireless access points typically comprise wireless routers and the like. Wireless mesh networks are convenient because they can be implemented with little or no effort to provide infrastructure. For example, it is generally not necessary to install additional cabling for access to the wide area network. Once a connection to the WAN is provided, the additional wireless access points can be configured to communicate and thereby provide network access whose geographic coverage is theoretically limited only by the distribution of the wireless access points of the mesh network.

Once a network is established, client devices can communicate over the network through the nodes. The nodes can comprise servers, routers, and other like devices for network access, which will be collectively referred to as network endpoints. Administrators of large network systems need to monitor the health of these network endpoints and attend to maintenance tasks, such as device configuration, update installation, and the like. Typically, administrators must login to each device and individually perform monitoring and control tasks for the device to which they are logged. Such tasks can be extremely time consuming and tedious, especially for networks of any size.

It would be advantageous if such monitoring and control operations could be performed remotely through a central point of control that can initiate network connections, such as TCP/IP connections, to each of the network endpoints in turn, as needed, and exchange messages to monitor and configure the devices. In practice, initiating network connections directly to network endpoints connected to the Internet is impossible or very difficult because many network endpoints are not directly addressable from the public Internet as a result of being located behind network address translators (NATs) or firewalls. NATs allow multiple devices to connect to the Internet using a single IP address by rewriting all outgoing packets so they appear to originate from a single IP and by demultiplexing all incoming packets according to which device initiated the connection. In general, network devices outside of a NAT cannot initiate network connections to devices located within or behind a NAT.

Such centralized monitoring and control would be especially advantageous in a wireless network, such as one in which an Internet Service Provider (ISP) provides Internet access to wireless routers through which client devices gain access to the Internet. Administrators of such wireless networks must be able to verify that the routers are operating correctly. It would also be advantageous for administrators of such wireless networks to have the ability to remotely make configuration changes to the routers in real-time.

From the discussion above, it should be apparent that there is a need for centralized real-time monitoring and control over network endpoints that may be located behind a NAT. The present invention satisfies this need.

SUMMARY

Described herein is a managed network of network devices that communicate using a network communication protocol, wherein messages received from a network gateway at a host include message information for verifying a message as coming from the managed network. If a received message is determined to be a data message, a data packet is extracted, wherein the data packet comprises a data payload encapsulated within a message of the network communication protocol. If the received message is not a data message, then identification information in the received message is located that identifies a network node of the managed network and the identification information is inserted into a node mapping table, wherein the identification information includes an internal address of the network node for an address space within the managed network, and the internal address is not valid outside of the address space. A persistent network connection is maintained with the network node in accordance with the network communication protocol such that a response message directed to the network gateway can be received at the network node.

In the managed network, unique network addresses are assigned to the nodes such that no two nodes will have the same address in the managed network and such that each node will always have the same network address regardless of changing its location or changing the network to which it is joined. The nodes, communicating together, comprise a mesh network. This provides remote management and control of the nodes from the host server, which is located outside of the mesh network, even if a node is located behind a firewall or network address translator (NAT), because server management messages are encapsulated within headers so that a persistent connection between the node and the external host server is maintained once the node sends a message to the host.

Other features and advantages of the present invention should be apparent from the following description of the preferred embodiments, which illustrate, by way of example, the principles of the invention.

DETAILED DESCRIPTION

A managed network of communicating devices includes a host server and nodes wherein unique network addresses are assigned to the nodes such that no two nodes will have the same address in the managed network and such that each node will always have the same network address regardless of changing its location or changing the network to which it is joined. The nodes, also referred to as network endpoints, generally communicate with each other by wireless techniques and thereby comprise a wireless mesh network. In another aspect, the managed network provides remote management of the nodes from the host server, which is located outside of the mesh network, even if a node is located behind a firewall or network address translator (NAT), because server management messages are encapsulated within headers so that a persistent connection between the node and the external host server is maintained once the node sends a specially configured "hello" message to the host. This technique involving unique network addresses and encapsulated messages is referred to herein as the "mtunnel" technique.

The nodes of the mesh network communicate with the host server over a network such as the Internet, using Internet protocol (IP) addressing techniques. Although the Internet will be referenced in the discussion that follows, it should be understood that the invention applies as well to network configurations generally.

Figure 1:
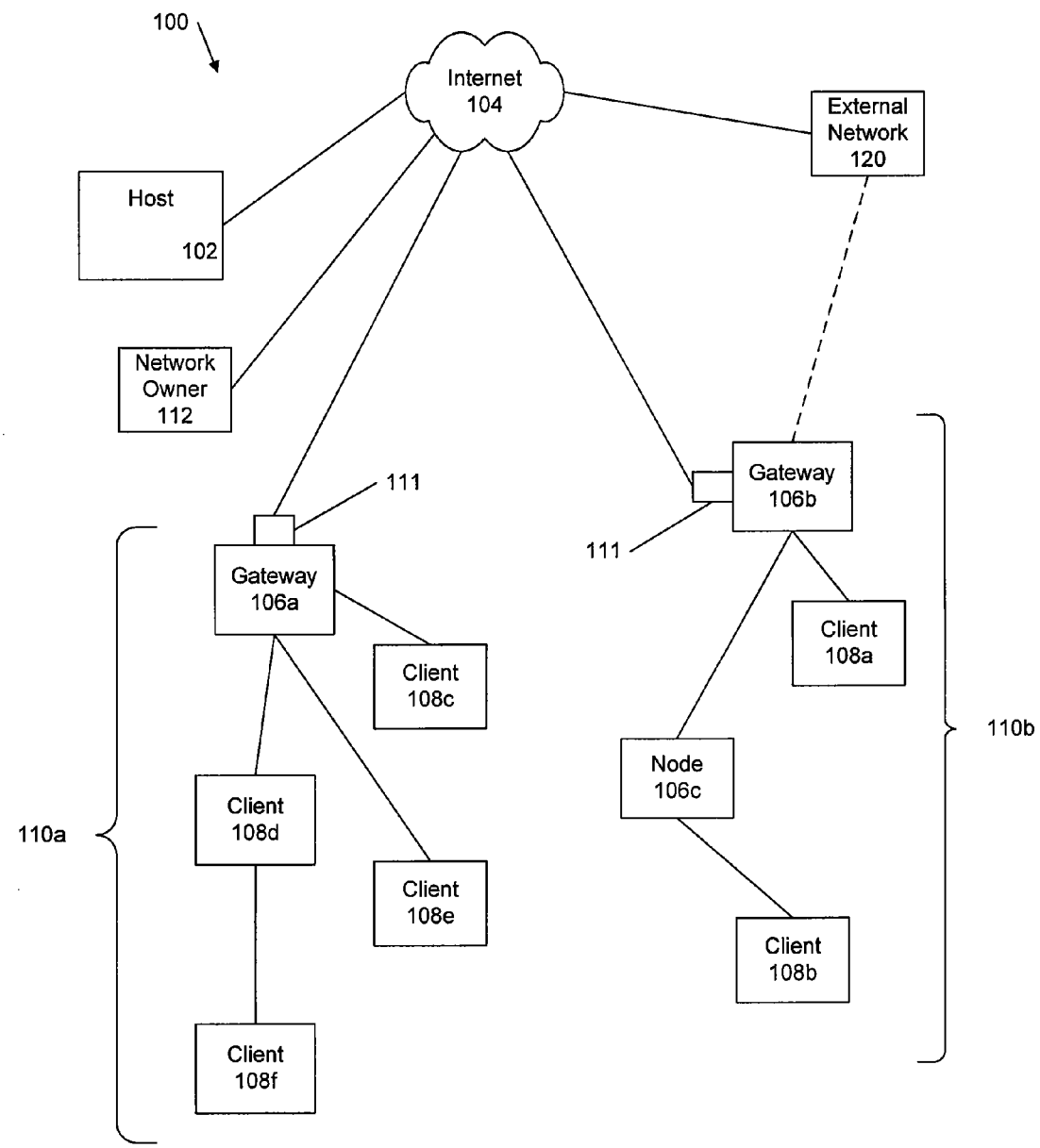
FIG. 1 is a block diagram representation of a hosted network 100 constructed in accordance with the invention.

FIG. 1 is a block diagram representation of a hosted network 100 constructed in accordance with the invention. The hosted network 100 includes a host 102 that communicates over a network infrastructure 104, such as the Internet, with multiple communication devices 106, 108. The communication devices include network traffic devices 106, such as access points or routers, and client devices 108, such as laptop computers, desktop computers, and portable computing devices, all of which are capable of communicating with each other using a network communications protocol specification. In FIG. 1, particular communication devices 106, 108 are designated with a letter suffix ("a", "b", etc.). Particular devices will be referenced by their respective suffix 106a, 106b, 106c and 108a, 108b, . . . , 108f. References to the devices 106, 108 without their particular suffix will be understood to be a reference to the group collectively.

All of the devices 106, 108 are capable of communicating with each other over a wireless network communications protocol specification, such as the 802.11x family specification of the IEEE, also referred to as "wireless broadband" or "WiFi". The devices 106, 108 define a managed network 110 whose member devices communicate with the host computer 102, also referred to as the backend server. The managed network 110 includes component local mesh networks that are identified with a letter suffix ("a" or "b") so that references to the local networks without their suffix are references to the local networks collectively as the managed network. When it is necessary to refer to a particular local network 110a, 110b, the suffix identifier will be used.

The traffic devices 106 in FIG. 1 that are designated as gateways 106a, 106c serve as an interface between the WAN (Internet) 104 and their respective local wireless mesh networks. FIG. 1 shows each gateway as having an interface device 111 interposed between itself and the Internet. That is, the interface device is upstream of the gateway. Those skilled in the art will understand details of such devices, which may comprise cable modems, DSL interfaces, and the like. Alternatively, the interface may be incorporated into the gateway device rather than being a separate component. Each gateway provides an interface between its respective mesh network and the Internet. For example, the gateway 106a is the Internet interface for the mesh network 110a comprising 106a and client 108c, client 108d, client 108e, and client 108f. The gateway 106b is the Internet interface for the mesh network 110b comprising gateway 106b, node 106c, client 108a, and client 108b. The gateways 106a, 106b communicate with the host 102 of the managed network and perform network address translation (NAT) functions for the devices 106, 108 within their respective managed networks 110a, 110b.

The mesh network 110 is operated under the control of a network owner 112, who can access management tools through a network portal interface of the host 102. Therefore, the network owner 112 is illustrated in FIG. 1 as being connected to the Internet 104, whereby the network owner using a computer or similar device can access a Web portal at the host 102 via a conventional Web browser. For the discussion herein, a reference to a "managed network" will be understood to be a reference to a local network having network traffic devices that operate according to the description and drawings herein under management of a network owner 112 through a service portal of the host 102.

The gateway devices 106a, 106b are also capable of network communications via a wired connection, such as Ethernet. The clients 108 can also have this dual capability. Thus, the managed networks 110a, 110b can include devices that are capable of communicating over both wired connections and wireless connections. In this discussion, the traffic devices 106 will also be referred to as routers or nodes of the managed networks. Thus, nodes as used herein comprise devices that can communicate over the managed networks 110 and can send data messages from other nodes toward destinations outside of the managed network, such as over the Internet 104 toward the host 102.

FIG. 1 shows that the network traffic devices (nodes) 106 can be provided with the ability to communicate with external networks that are outside of any of the managed networks 110. Thus, a dotted line represents a connection from the second gateway 106b to an external network 120. The external connection between the two 106b, 120 can comprise a wired connection or a wireless connection.

In FIG. 1, the network traffic device corresponding to the gateway 106b is shown with a connection to an external network 120 through which the gateway 106b can forward packets received from the clients 108a, 108b of its mesh network 110b to the uplinked external network 120. Therefore, the gateway 106b is acting as a bridge from the managed network 110b to the uplink external network 120 and performs a network address translation (NAT) function for the managed network relative to the uplinked network. The connection from the managed network gateway 106b to the external network 120 can be either a wireless connection or a wired (Ethernet) connection. Any one of the traffic devices 106 constructed in accordance with the invention can perform the uplink function, as described more fully below, including the gateway devices 106a, 106b and the node 106c. That is, all of the traffic devices 106a, 106b, 106c have a similar construction and therefore have similar operational capabilities.

A. Overview

In computer networking terms, the mtunnel technique implements a centralized server that can exchange network packets with many network endpoints (which will also be referred to as "nodes"), each of which are connected to the Internet but which do not necessarily have publicly routable IP addresses (i.e., the endpoints may be behind NATs). At a high level the mtunnel technique may be described as involving two operations: (1) assign a unique IP address to each of these nodes; and (2) set up a message format that allows nodes and the server to exchange IP packets using "IP over UDP encapsulation". These two operations are described further below.

1. Assign a Unique IP Address

For proper communications, the assigned IP address should be a private address that is unused elsewhere on the Internet. In the mtunnel system, this address assignment is accomplished by agreeing on a one-to-one, repeatable mapping between the media access control (MAC) hardware address of each node and the IP address that will be assigned to it. MAC addresses are six bytes and the first three bytes are unique to each manufacturer, leaving three bytes of varying MAC address per node device. IP addresses are four bytes, so picking a class A address block (e.g. "10.x.x.x") leaves three bytes available for use as a varying IP address. The system implements mapping using the low three bytes of the MAC address for a given node as the low three bytes of that node's IP address.

For example, if using the 10.x.x.x IP address range as mentioned above, a node with a MAC address of 00:18:0a:01:07:35 would be assigned the IP address 10.1.7.53. Those skilled in the art will recognize that MAC addresses are written in hexadecimal notation and IP addresses are written in decimal notation, hence the low three bytes of the MAC address (01:07:35) are rewritten in the IP address format (1.7.53). One advantage of this simple and repeatable mapping between MAC addresses and IP addresses is that no state information needs to be stored in order to determine the IP address for a node, and as new nodes are manufactured their IP addresses can be easily determined by any part of the system without any communication taking place.

2. Message Encapsulation

In the second aspect of the mtunnel technique, a message format is set up that allows nodes and the server to exchange IP packets using "IP over UDP encapsulation". Details of the messages are explained below, but essentially the mtunnel technique of encapsulation works by wrapping IP packets in a special "mtunnel header" and then sending the encapsulated packets inside UDP datagrams between the nodes and the host, which will also be referred to as the server, for the managed network. This technique permits communications to occur directly between server and nodes, even if the nodes are behind a NAT. This is because devices behind a NAT (such as the nodes in the mesh network described herein) can send outgoing UDP datagrams to the server at any time, and the NAT will allow incoming datagrams that are in response to datagrams sent by a given device behind the NAT.

B. Message Types

The mtunnel system has three types of messages that are sent as UDP datagrams between nodes and the external host server, which will also be referred to as the "mtunnel server". The message types include the: (1) MTUNNEL_HELLO; (2) MTUNNEL_HELLO_ACK; and (3) MTUNNEL_DATA messages.

(1) The MTUNNEL_HELLO message is sent by each node at regular intervals (for example, in the current implementation, roughly every 30 seconds) to a well-known address and UDP port on the mtunnel server. The HELLO message has two main fields: a node IP address field, and an "authentication secret" field. The authentication secret is a password established by the network owner. Each network owner or operator of a managed network will be associated with a password, or authentication secret. The mtunnel server uses the contents of the HELLO message to keep a mapping of how to reach the node that sent the HELLO message. Further details are described below in the server section discussion.

(2) The MTUNNEL_HELLO_ACK message is sent by the mtunnel server in response to each MTUNNEL_HELLO message that it receives. The purpose of the HELLO_ACK message is to ensure that, by sending a response UDP datagram to the node, any NATs located along the network path from the mtunnel server back to the node will maintain state that will allow future incoming packets from the server to be delivered to the node.

(3) The MTUNNEL_DATA message can be sent in both directions between the nodes and the mtunnel server, and contains the actual encapsulated IP packets that the server and node wish to exchange. A typical TCP/IP packet that is encapsulated in an MTUNNEL_DATA message and sent over the wire will have a packet format that looks something like the format below in Table 1:

TABLE 1

| UDP header | mtunnel header | IP header | TCP header | data payload |
|---|---|---|---|---|

All message fields to the right of the "mtunnel header" field of Table 1 beginning with "IP header" is what a conventional TCP/IP packet generally looks like, so the mtunnel encapsulation may be characterized as appending an mtunnel header to the IP packet and sending it as a UDP datagram.

C. Device Construction

Figure 4:
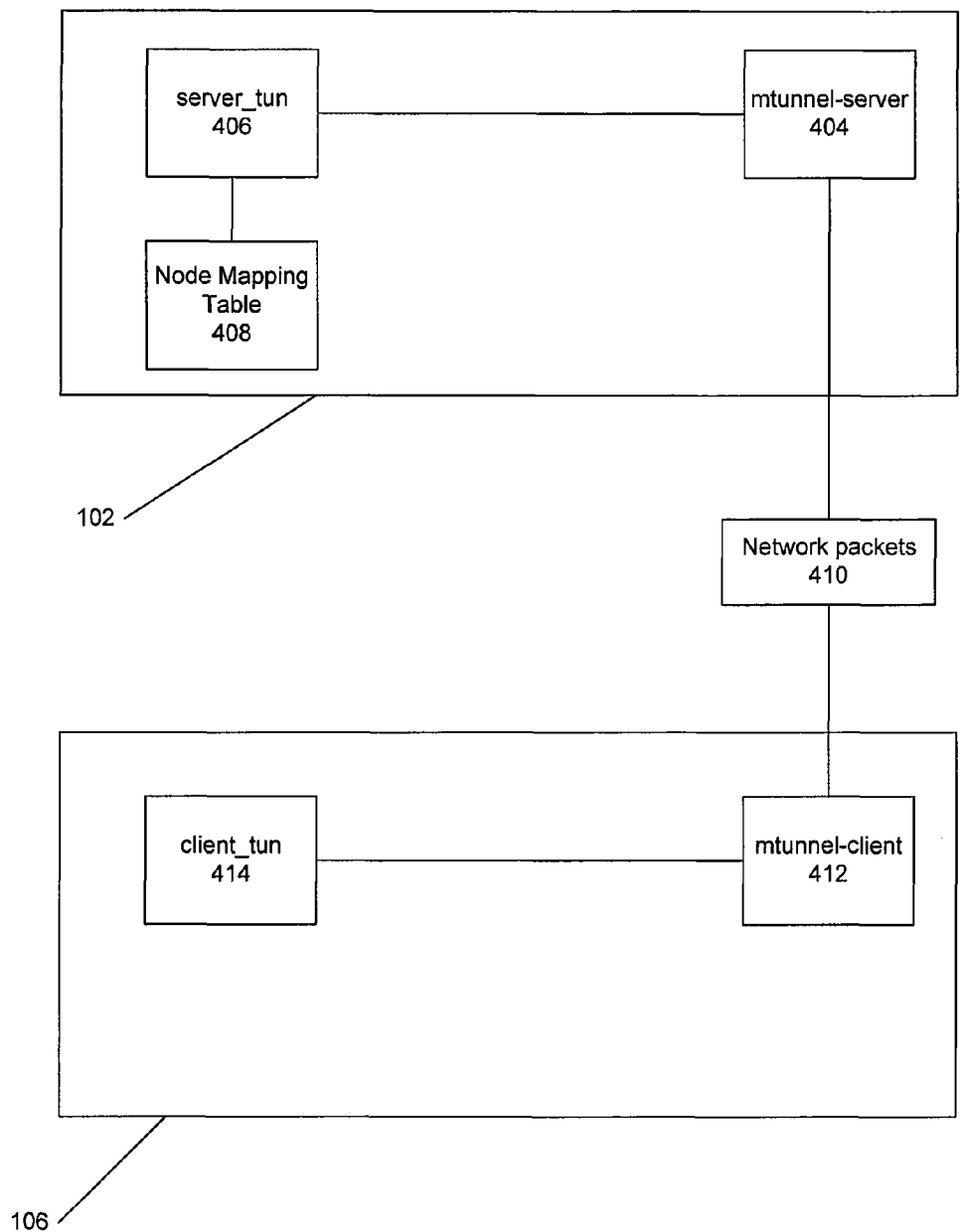
FIG. 4 is a block diagram showing the construction of the host and the node of the FIG. 1 system.

FIG. 4 is a block diagram that illustrates construction of the host server 102 and the nodes 106 of the managed network. FIG. 4 shows the configuration of the host server, which includes a processor that provides an operating environment in which an mtunnel-server process 404 comprising an executing program communicates with a server_tun process 406, which comprises an executing program that maintains a node mapping table 408. Network packets 410 are sent and received through the mtunnel-server process (which will be referred to as the "server"). Similarly, the node (router) 106 includes a processor that provides an operating environment in which an mtunnel-client process 412 executes. The mtunnel-client process comprises an executing program that sends and receives network packets 410 through a node_tun process 414 of the router. The node_tun process comprises a program executing within the operating system of the router. Additional details of construction and operation for the server and router nodes will occur to those skilled in the art in view of the description herein.

1. Server Details

The mtunnel server provides an address space bridge between the nodes and any software running on the server computer that wishes to reach the nodes. Recall that the nodes are behind a NAT and have IP addresses that are not publicly routable from the Internet, so without this address space bridge, the nodes cannot be reached from outside of the NAT. Let us suppose that nodes all have addresses in the 10.x.x.x range.

In the illustrated embodiment, the mtunnel server computer runs the Linux operating system and has set up a Linux "tun" networking device, which acts as a bridge between user-space programs and the Linux networking stack. A "tun" device appears to programs on the host server computer to be just like a regular Ethernet adapter, the difference being that packets sent to the tun device get delivered to a particular program on the computer, rather than a physical networking device.

In the case of the mtunnel server, we set up a particular tun device called "server_tun" with a network routing that causes all packets addressed to 10.x.x.x (the address range of the nodes in the managed network) to be routed to "server_tun". The host server is configured so that the mtunnel server program, herein called "mtunnel-server", is connected to the "server_tun" device, which operates as a virtual ethernet device. The result is that any IP packets sent by any program on the mtunnel server to a 10.x.x.x address will be delivered to the "mtunnel-server" program as if the mtunnel-server program were an ethernet driver.

a. Mtunnel-Server State

The mtunnel-server program maintains a data structure that keeps the state information necessary to reach all nodes of the network being managed by the host. The data structure comprises a table that maps a node IP address to the IP address and UDP port of the externally routable network device behind which the node is located. The node mapping table can have the exemplary structure illustrated below in Table 2:

TABLE 2

| Node IP | External IP | External port | Timestamp |
| --- | --- | --- | --- |
| 10.1.2.3 | 18.5.7.2 | 5678 | 1/7/07 15:35 |
| 10.25.161.4 | 24.167.25.6 | 5933 | 1/7/07 15:17 |
| ... | ... | ... | ... |

Thus, the node IP address comprises an internal address of the network node for an address space within the managed network such that the node IP address is not valid outside of the managed network address space.

b. Operation of the Mtunnel-Server

The mtunnel-server program listens for UDP packets on a well-known IP address and UDP port, to which all nodes of the managed network are configured to send their mtunnel UDP datagrams. As mentioned above, the mtunnel-server program also receives IP packets sent to the "server_tun" device on the local system. Following is a list of events that are processed by the mtunnel-server program and the actions that the program takes to respond to each event.

(a) Receive an MTUNNEL_HELLO message on its UDP port
  (1) Read the node's IP and authentication secret data fields from the encapsulated message, and make sure they match (i.e., make sure they are associated with a valid network owner for the managed network system).
  (2) Retrieve the originating IP address and UDP port from the UDP datagram that the HELLO message arrived in.
  (3) Create an entry for this node's IP address in the node mapping table, recording the UDP source address and port as the "External IP/port", and setting the timestamp to be the current time. If the node mapping table already contains an entry for this node, the existing table entry is updated with the new values.
  (4) Send an MTUNNEL_HELLO_ACK message back to the node (encapsulated in a UDP datagram addressed to the same External IP/port).

(b) Receive MTUNNEL_DATA message on its UDP port
  (1) Read the node's IP and authentication secret data fields from the encapsulated message, and make sure they match.
  (2) Strip the mtunnel header from the message, and send the IP packet it contains to the "server_tun" device, which will result in the appropriate local program receiving the packet.

(c) Receive an IP packet on the tun device
  (1) Examine the destination address in the IP packet and make sure it is an address in the node's address range.
  (2) Look in the node mapping table to see if it already has an entry for the given destination IP address. If it does not, then discard the packet.
  (3) Retrieve the external UDP IP address and port number from the node mapping table entry for the destination node, encapsulate the IP packet in an MTUNNEL_DATA message, and send in a UDP datagram to the appropriate IP address and port.

c. Periodic Actions

In addition, the mtunnel-server program periodically scans through the node mapping table and removes any entries whose timestamp is "old" (e.g. more than five minutes older than current clock time). This helps to keep the size of the table fairly small, and saves time and system resources by avoiding attempts to forward packets to nodes that are no longer checking in (and therefore must not be connected to the Internet). The periodic timestamp checking is optional behavior that is not necessary for basic functioning of the system, but can achieve increased efficiency of operation.

2. Node Details

Each node in the mtunnel system runs a program that we will call "mtunnel-client" program, which is responsible for relaying mtunnel packets between the local node and the mtunnel server. Like the host server, the node in the illustrated embodiment runs a Linux operating system and has a "tun" virtual ethernet device, which we will call "node_tun". The "node_tun" device is configured with an agreed-upon IP network address, for example 10.0.0.2. The "mtunnel-client" program opens a UDP connection to the mtunnel server's well-known IP address and UDP port. It also opens the "node_tun" device so that any packets sent to the address 10.0.0.2 on the local node will go to the mtunnel-client program as if the mtunnel-client program were an ethernet driver.

a. Node Operation and Events

At predetermined intervals, such as every 30 seconds, the mtunnel-client program sends an MTLNNEL_HELLO packet to the host server, with the local node IP address of the client and the appropriate "authentication secret" for the node. When the mtunnel-client program reads a packet from the "node_tun" device, it encapsulates the packet in an MTUNNEL_DATA message and sends it via UDP datagram to the mtunnel server. When the mtunnel-client program receives an MTUNNEL_DATA message from the mtunnel server, it does two things:
  (1) Verifies that the source address is 10.0.0.2 and the destination address is this node's local address. This prevents us from accidentally sending packets via mtunnel to other devices behind the NAT; and
  (2) De-encapsulates the IP packet (removes the mtunnel message header) and sends the packet to the "node_tun" device, where it is delivered to the node's kernel networking system.

D. System Operations

1. Example Application

Typical applications of the mtunnel system are for performing "real time monitoring" of the nodes in the system.

For example, we might wish to determine the performance of the network by measuring average latency between our server and one of our nodes (routers). With the mtunnel system in place we can do this very easily; we simply have a program on the mtunnel server computer send ping packets to the given node's 10.x.x.x address.

Without the mtunnel technique, these ping packets could not reach the actual node from the server (recall that the node is behind a NAT). However, with the mtunnel technique, the ping packet makes the following trip:

(1) the ping packet is routed to the "server_tun" device on the server and is then read by the "mtunnel-server" program.
(2) the node's IP address is found in the node mapping table; the ping packet is encapsulated in an MTUNNEL_DATA message and is sent to node's external IP address via UDP datagram.
(3) the UDP datagram arrives at the node, and is read by the "mtunnel-client" program.
(4) the "mtunnel-client" program de-encapsulates the ping packet (removes the MTUNNEL_DATA header) and sends the extracted ping packet to the "node_tun" device.
(5) the ping packet is read by the node's networking stack and a ping response packet is prepared and sent to 10.0.0.2.
(6) the ping response arrives on the "node_tun" device and is read by the "mtunnel-client" program, which wraps it in an MTUNNEL_DATA message and sends it to the server via UDP.
(7) the "mtunnel-server" receives the UDP datagram, removes the MTUNNEL_DATA header, and forwards the ping packet to the "server_tun" device on the server.
(8) the ping response packet is delivered by the Linux kernel to the program that initiated the ping request.

The end result is that we are able to measure round-trip latency to the node. In a similar way, we can initiate arbitrary network connections from our server to the node, such as an SSH connection allowing us to log into the node and configure it.

The data provided by the host in data messages to the nodes can comprise scripts or applications, or portions of scripts and applications, that can be sent to the nodes via the mtunnel technique described herein, such that the receiving node will properly collect the data messages and install or execute such scripts and applications in accordance with instructions contained in the host data messages. In this way, the resulting installed scripts and applications can comprise processes that are executed by the node and that perform monitoring and control functions as dictated by the host instructions.

2. Alternatives and Related Technology

One alternative to an active monitoring and control system such as the mtunnel technique described herein is a passive monitoring and control system, where all connections are initiated by the network endpoints themselves rather than the central server. For example, we could arrange so that each node periodically sends a message to our central server with key information about its health and operation, and the nodes could periodically download new configuration information. The main downside of this approach is that it does not allow for any real-time operations; everything must be coordinated ahead of time and initiated by the node itself, not by the central server. Operations like the "ping" example given above are not possible.

With the mtunnel system we can perform arbitrary and limitless configuration of the nodes from our central control point, because we can initiate a new network connection directly to the node at any time. This offers an extraordinary degree of flexibility and control over the network system.

Some systems exist for allowing communication between network devices that are behind NATs. For example, see the network protocol known as STUN (Simple Traversal of UDP through NATs. The STUN approach, however, is more complex than the solution described herein and attempts to solve a different problem, namely attempting direct communication between two devices that are both located behind NATs. The STUN protocol also does not encapsulate packets. In contrast, the mtunnel technique makes use of one endpoint being a server that has a fully routable Internet address, and encapsulates all packets. This approach permits arbitrary packet types to be exchanged using the mtunnel technique, whereas the STUN protocol can only pass UDP traffic.

In accordance with the invention, the network host 102 provides management tools to assist a network owner 112. The network owner can access the management tools from any network connection that supports communication with the host 102. For example, the network owner can access the management tools through any Internet connection. In the illustrated embodiment, the management tools are provided through a user interface that is accessed through a conventional Web browser. That is, the management tools can be accessed through a Web portal such that the network owner can provide identification information such as user name and password for authentication. The Web portal then permits selection of the various management tools through which the network owner manages the mesh network 110. A variety of management tools can be provided.

The processing of the host server 102 and nodes 106 may be better understood with reference to the flowchart illustrations described below.

Figure 2:
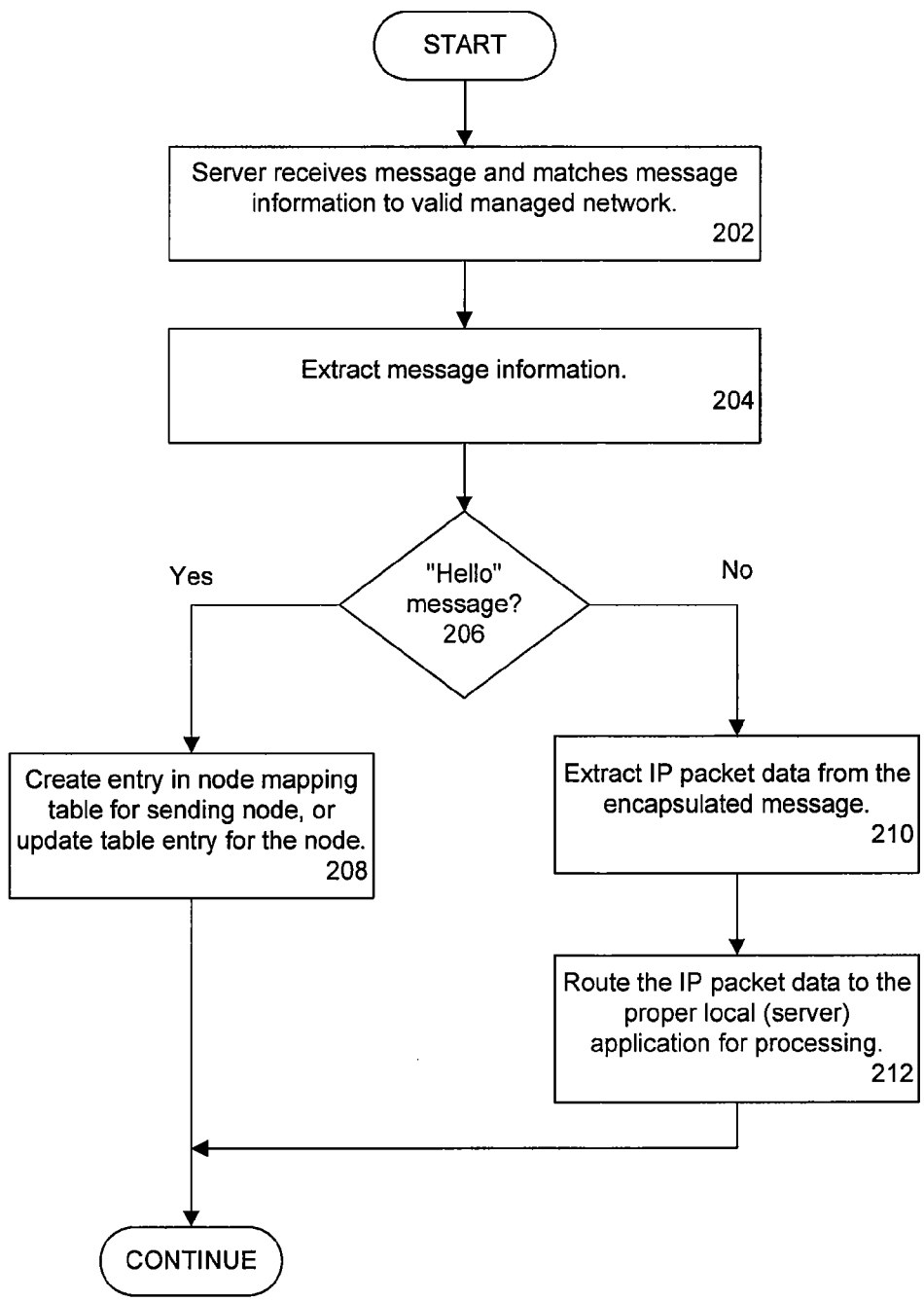
FIG. 2 is a flowchart that illustrates processing of the network host of the FIG. 1 system.

FIG. 2 shows the operation of the host server 102 of FIG. 1. In the first operation, represented by box 202, the server receives a message and matches the message information to a valid managed network in data maintained by the host. For example, account information and SSID information would be matched to verify that the account of the network owner 112 is in good standing. If the message is associated with a valid managed network, then at box 204 the message information is extracted to determine the nature of the message itself. At box 206, the message information is checked to determine if the message is a HELLO message. An affirmative outcome at the decision box 206 results in the server creating an entry in the node mapping table for the node that sent the received message. If an entry already exists in the table, then the table information is updated as needed. Operation of the server then continues.

If the message is a DATA message, a negative outcome at box 206, then processing moves to box 210, where the IP packet data is extracted from the encapsulated message. At box 212, the IP packet data is routed to the appropriate processing at the server. For example, a return message may be needed, or operations on the extracted data may be required. Once the extracted data payload is sent on for processing, the operation of the server continues.

Figure 3:
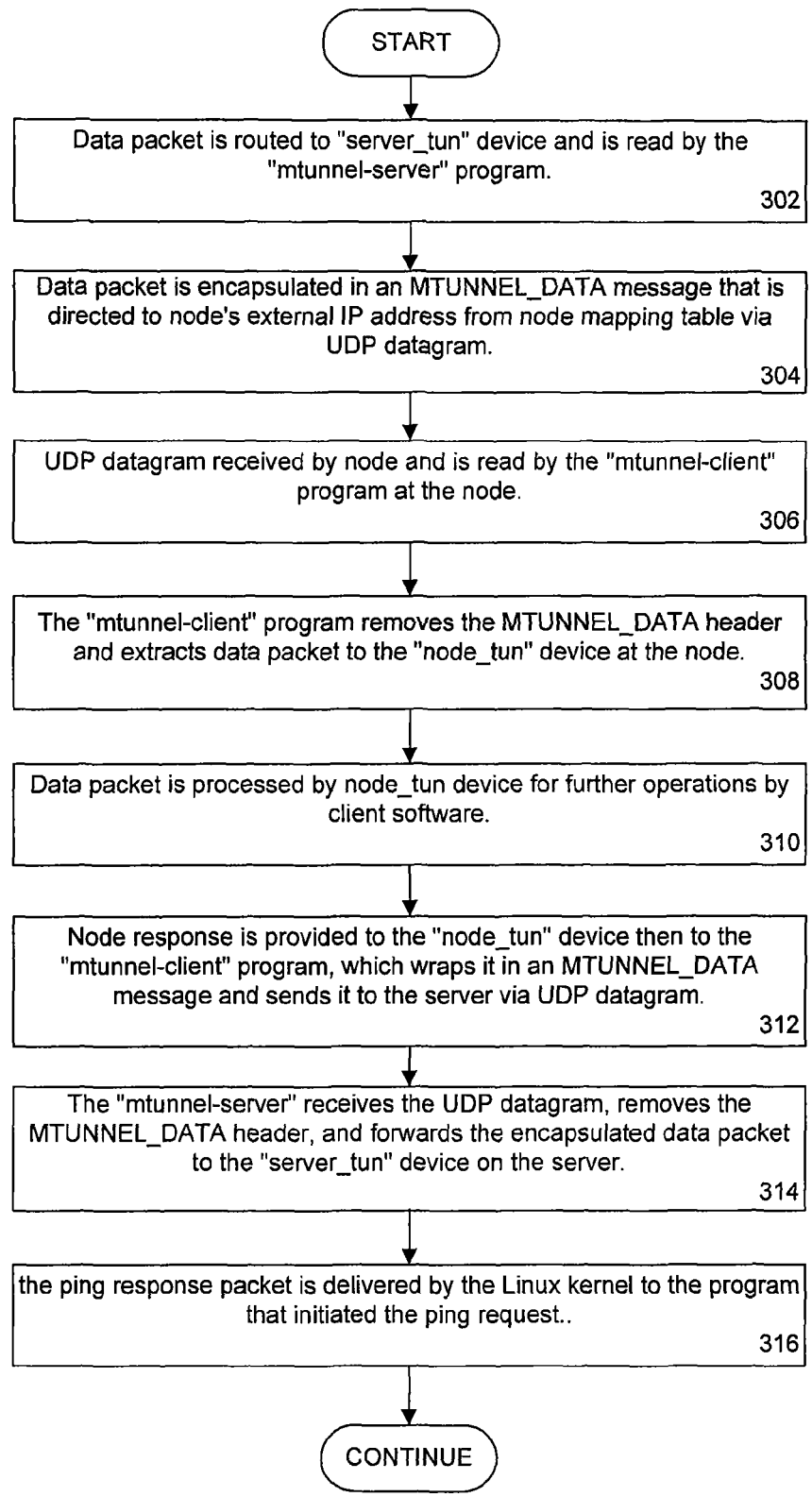
FIG. 3 is a flowchart that illustrates processing in connection with exchange of messages between the host and a node in the FIG. 1 system.

FIG. 3 shows the operation of the managed network, and illustrates operations of the server and node in exchanging messages.

At box 302, a data packet for delivery to a node is routed to the server_tun device of the host server and is read by the mtunnel-server program. The data packet may be produced, for example, by software applications executing at the server and may include a variety of network management, report generation, accounting, and other applications programs. The data packet is encapsulated at box 304 in an MTUNNEL_DATA message for transport as a UDP datagram, as described above. The data message is then directed to the node according to the node's external IP address information from the node mapping table of the host server. For example, a program on the mtunnel server computer may simply address message packets to the given node's 10.x.x.x address.

At box 306, the UDP datagram is received at the destination node and is read by the node's mtunnel client. At box 308, the mtunnel-client program removes the MTUNNEL_DATA header and extracts the data payload, providing the data to the node_tun device of the node. Box 310 shows that the extracted data is processed by the node_tun device for processing by appropriate software at the node, including preparation by software of any appropriate node response that might be necessary. Box 312 shows that the node response is directed to the mtunnel-client program, where the response is wrapped in an MTUNNEL_DATA message and is sent to the server as a UDP datagram message. At box 314, the mtunnel-server program receives the UDP datagram, extracts the encapsulated data packet (node response), and provides it to the server_tun device of the server. Box 316 shows that the extracted data packet is ultimately provided to the appropriate server program (i.e., the program that initiated the sending of the original server data packet, to which the node prepared the response). Network operations then continue.

Without the mtunnel technique, the exchange of data described in FIG. 3 could not take place and the initial data could not reach the destination node from the server (recall that the node is behind a NAT). The mtunnel technique of UDP encapsulation permits the persistent network connection to be maintained for two-way message trafficking.

Thus, the mtunnel technique permits the host 102 of the managed networks 110 to have control and monitoring capability over all the routers 106 in the managed networks. The routers all collect operational statistics and report the statistics back to the host. This technique permits the host to provide network telemetry that can be presented to network owners through the Web portal management interface. The routers can perform as needed by establishing the persistent VPN tunnels back to the host over IP, such that the host can initiate message traffic that will penetrate any NATs and firewalls between the host 102 and the routers 106. Delivery through NATs and firewalls is ensured because, through their operation in accordance with the invention, the routers first initiate outbound messages towards the host, establish the connections, and then the host utilizes the persistent tunnels for traffic bound for the routers.

Using the mtunnel technique, the host 102 can query the routers for data as needed, rather than having the routers proactively report statistics at regular intervals. This reduces unnecessary network traffic and ensures timeliness of router responses. The messages from the host can also contain code fragments for remote execution. For example, the host can send firmware upgrades, reconfigure settings, and send scripts for execution and/or installation by the destination routers. The query messages can be sent and responses received in real-time, so that responses in general, and operational statistics in particular, will be current and will help to provide a network management system with increased accuracy, efficiency, and responsiveness. The mtunnel technique described herein provides a more flexible system than procedures such as SNMP, which typically will require developing trap handlers for processing messages from a remote source. Moreover, such SNMP trap handlers cannot execute arbitrary commands, as can be performed with the mtunnel technique.

If desired, the network connection from the server to the node can comprise an SSH connection that permits the host 102 to log into the node and configure it. For example, scripts and other software can be provided to the node through the SSH connection such that the scripts and software will be processed and installed as appropriate. In this way, control of the node from the server can be effectively exercised.

Figure 5:
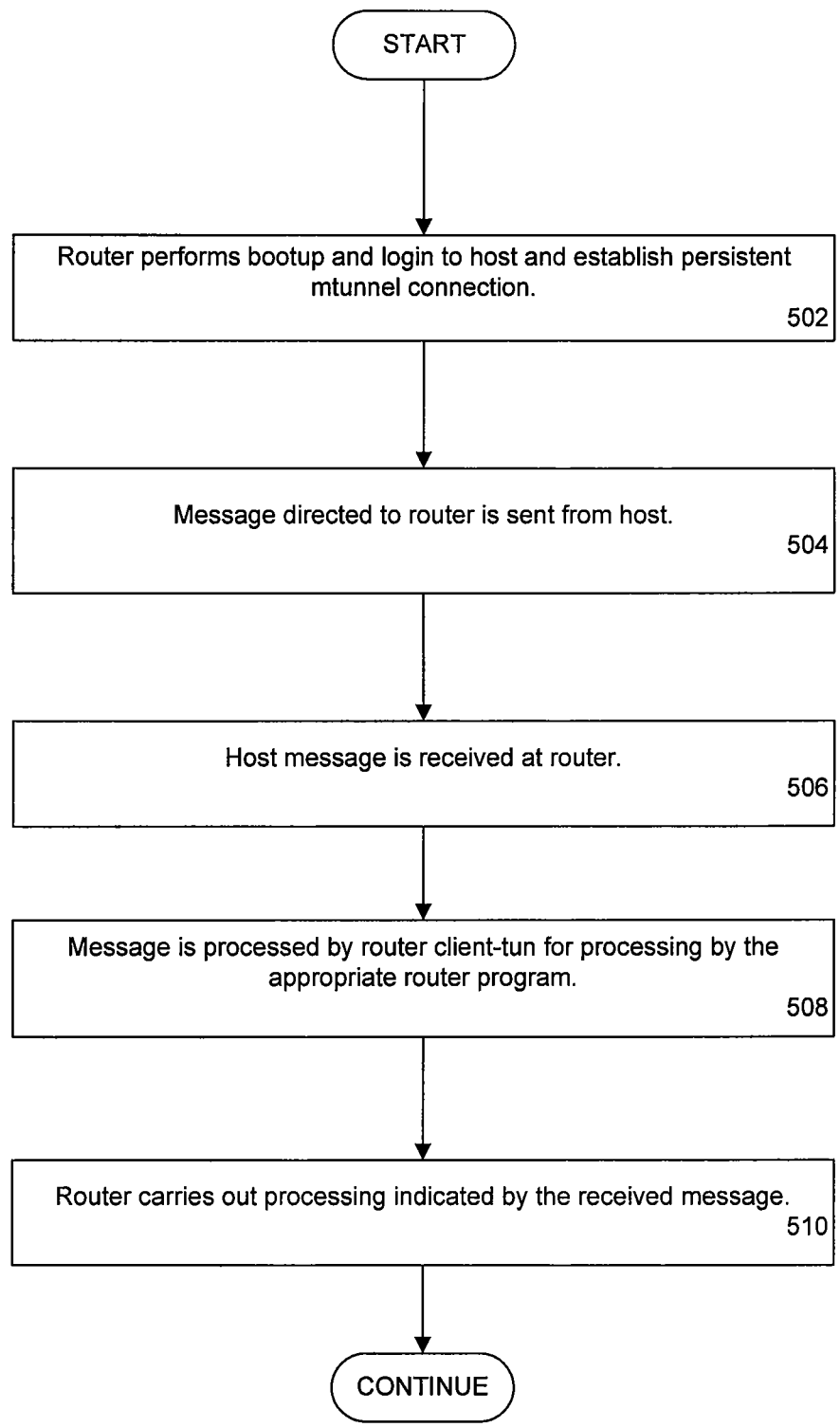
FIG. 5 is a flowchart that illustrates processing of the mtunnel operations of the FIG. 1 system.

The mtunnel operations described above that permit remote control and monitoring are illustrated in FIG. 5, which shows operations involving host messages for control and monitoring (which will be referred to generally as query messages). The query messages are received at a router of the FIG. 1 system. In the first operation, at box 502, the router 106 in a managed network 110 performs a bootup and login procedure to establish a persistent mtunnel connection with the host 102. Next, at box 504, the host sends a query message to a particular router device 106. As noted above, the router IP addresses in the managed networks are automatically assigned based on the router MAC addresses.

When the host query message is sent out over the Internet, it is directed to the appropriate gateway, which performs a NAT function for its associated managed network, and is received at the intended recipient router. This operation is represented by the box numbered 506. Upon receipt at the intended router, the processing described above in connection with FIGS. 2-4 is carried out to deliver the message and its payload to the proper routine or process at the router. This processing is indicated at box 508. Next, at box 510, the router carries out the processing indicated by the message. As noted above, the message may direct the router (through suitable programs and processes installed at the router) to perform desired operations and provide requested responses and carry out specified actions. The received message may include a program fragment or portion of a script, in which case the router may collect fragments from multiple messages until the complete program or script is received, at which time the router can execute the program or script. Those skilled in the art will understand how to generate appropriate router-side programs and processes to carry out desired actions that are specified from the managed network host 102.

A variety of hardware configurations can be used for the devices described above. For example, conventional server and desktop computers can be used for the server host 102. In the illustrated embodiment, the server operates the Linux operating system. Other details of construction and operation will occur to those skilled in the art in view of the description herein. The nodes 106 can comprise routers, wireless access points, and suitably configured computer devices that might otherwise comprise clients 108 in the managed network. In the illustrated embodiment described herein, the nodes that process network traffic are specified as operating with the Linux operating system. Those skilled in the art will appreciate that a wide variety of device operating systems other than Linux can provide a suitable environment for execution of the operations described herein. Thus, any computer device that can perform the operations described herein can be utilized in a managed network system constructed in accordance with the invention.

Although the network communications have been described above in accordance with the Internet protocol (IP), it should be understood that a wide variety of network communication protocols can be accommodated in accordance with the invention. The operations described herein for the gateways routers 106 and client devices 108 can be performed by device firmware or by application software installed on the respective devices. All of the devices capable of network communications will include any necessary network interface components, as will be known to those skilled in the art. The programming such as firmware and application software for the operations described herein can be installed through conventional manufacturing and production processes and through typical program installation techniques for computer devices. For example, the programming can be installed from program media containing machine instructions that can be read from media such as CD or DVD optical disc devices such that when the instructions are executed by the computer device they will cause operation in accordance with the techniques described herein. Other sources of such programming include external program sources such as memory chips, floppy disks, thumb drives, flash memory, and the like that are received into reader devices such that the program instructions can be installed.

The present invention has been described above in terms of presently preferred embodiments so that an understanding of the present invention can be conveyed. There are, however, many configurations for network devices and management systems not specifically described herein but with which the present invention is applicable. The present invention should therefore not be seen as limited to the particular embodiments described herein, but rather, it should be understood that the present invention has wide applicability with respect to network devices and management systems generally. All modifications, variations, or equivalent arrangements and implementations that are within the scope of the attached claims should therefore be considered within the scope of the invention.

We claim:

1. A method of operating a host device for communication using a user datagram protocol (UDP), the method comprising:

receiving a UDP message from a network gateway at the host device, the network gateway device being one of a plurality of network gateway devices managed by the host device over a wide area network (WAN), wherein the host device provides access to management tools for the network gateway devices, wherein the network gateway devices are network traffic devices within local area networks (LANs) that provide a gateway for their respective LANs to the WAN, wherein the host device maintains a persistent network connection with each of the network gateway devices to send network configuration data for configuring the respective network gateway devices and to receive operational statistics from the respective network gateway devices, wherein the persistent network connection includes a virtual private network (VPN) tunnel to exchange the network configuration data and operational statistics encapsulated therein, wherein the network gateway devices and the host device each have an internal Internet protocol (IP) address that is a private address from within an IP address range used for the persistent network connections over the WAN, wherein the network gateway devices include a first network gateway device having a first public IP address that is publicly routable within the WAN and a first internal IP address for communicating with the host device via a first VPN tunnel, wherein the network gateway devices include a second network gateway device that is behind the first network gateway device, the second network gateway device having a second internal IP address for communicating with the host device via a second VPN tunnel;

detecting message information in the received UDP message that verifies it is a management message;

determining if the received UDP message is a data type message;

extracting an IP packet encapsulated within the received UDP message in response to determining that the received UDP message is a data type message, the IP packet comprising the internal IP address of the gateway device; and locating identification information in the received UDP message that identifies the internal IP address of the network gateway device and inserting or updating an entry of a node mapping table based on the identification information, wherein the entry of the node mapping table maps the internal IP address of the network gateway device with an external IP address associated with the network gateway device that is routable within the WAN, wherein the external IP address is either a public IP address of the network gateway device or a public IP address of an externally routable network device behind which the network gateway device is located, wherein the node mapping table includes a first entry associated with the first network gateway device and a second entry associated with the second network gateway device, wherein the first entry maps the first public IP address of the first network gateway device with the first internal IP address of the first network gateway device, and wherein the second entry maps the first public IP address of the first network gateway device with the second internal IP address of the second network gateway device, such that the host device does not need to know whether any of the first and second network gateway devices is behind another network gateway device when the host device communicates with any of the first and second network gateway devices.

2. The method as defined in claim 1, further comprising:

preparing a second IP packet, wherein the second IP packet includes the internal IP address of the network gateway device, encapsulated within a second UDP message; and transmitting the second UDP message to the network gateway device based on the external IP address associated with the network gateway device via the respective persistent network connection over the WAN, wherein the network gateway device is to decapsulate the second UDP message to reveal the second IP packet.

3. The method as defined in claim 2, wherein the second IP packet is prepared by a host message handling program and processed at a tun device of the host device for network transport, wherein the tun device is a virtual network device operating as a bridge between an application running at the host device and a network stack of an operating system of the host device, wherein the tun device is configured to process network messages that are addressed based on the internal IP address of the host device.

4. The method as defined in claim 1, wherein the persistent network connection comprises a virtual private network (VPN) tunnel that was automatically established between the network gateway device and the host device when the network gateway device booted up and logged onto the host device, and wherein the received UDP message was received via the VPN tunnel from the network gateway device.

5. The method as defined in claim 1, wherein the network configuration data comprises at least one of firmware upgrades, reconfiguration of settings, and executable scripts to the network gateway device.

6. The method as defined in claim 1, wherein detecting message information in the received UDP message comprises:

extracting an authentication secret embedded within the received UDP message; and authenticating the received UDP message by matching the extracted authentication secret with a predetermined password uniquely identifying an owner of the network gateway devices, wherein the received UDP message is verified if the authentication secret matches the predetermined password.

7. The method as defined in claim 1, wherein the internal IP address of the network gateway device was generated based on a media control address (MAC) of the network gateway device.

8. The method as defined in claim 1, wherein receiving the UDP message comprises processing the received UDP message at a tun device of the host device and providing the received UDP message to a host message handling program, wherein the tun device is a virtual network device operating as a bridge between an application running at the host device and a network stack of an operating system of the host device, wherein the tun device is configured to process network messages that are addressed based on the internal IP address of the host device.

9. The method as defined in claim 1, further comprising:
receiving a second UDP message from a network traffic device via the network gateway device, the network traffic device being one of a plurality of network traffic devices on the LANs behind the plurality of network gateway devices, wherein the network traffic devices provide to a plurality of client nodes access to the gateway devices in order to reach the WAN, wherein each of the network traffic device is assigned with an internal IP address within the IP address range used for the persistent network connections over the WAN; and
extracting and storing at the host device operational statistics of the network traffic device from the second UDP message.

10. The method as defined in claim 9, wherein each of the network traffic devices maintains a persistent network connection with the host device using the respective internal IP addresses to receive configuration data from the host device and to send operational statistics to the host device.

11. The method as defined in claim 10, wherein one or more of the network traffic devices behind the network gateway device are wireless access points communicating with each other, forming a mesh wireless network.

12. A method of operating a device for communication over a network, the method comprising:
receiving a user datagram protocol (UDP) message from a network gateway device at a host device, wherein the host device processes the received UDP message at a tun device of the host device and provides the received UDP message to a host message handling program, the network gateway device being one of a plurality of network gateway devices managed by the host device over a wide area network (WAN), wherein the host device provides access to management tools for the network gateway devices, wherein the network gateway devices are network traffic devices within local area networks (LANs) that provide a gateway for their respective LANs to the WAN, wherein the host device maintains a persistent network connection with each of the network gateway devices to send network configuration data for configuring the respective network gateway devices and to receive operational statistics from the respective network gateway devices, wherein the persistent network connection includes a virtual private network (VPN) tunnel to exchange the network configuration data and operational statistics encapsulated therein, wherein the network gateway devices and the host device each have an internal Internet protocol (IP) address that is a private address from within an IP address range used for the persistent network connections over the WAN, wherein the network gateway devices include a first network gateway device having a first public IP address that is publicly routable within the WAN and a first internal IP address for communicating with the host device via a first VPN tunnel, wherein the network gateway devices include a second network gateway device that is behind the first network gateway device, the second network gateway device having a second internal IP address for communicating with the host device via a second VPN tunnel;

detecting message information in the received UDP message that verifies it is a management message;

determining if the received UDP message is a data type message;

extracting an IP packet encapsulated within the received UDP message in response to determining that the received UDP message is a data type message, the IP packet comprising the internal IP address of the gateway device;

locating identification information in the received UDP message that identifies the internal IP address of the network gateway device and inserting or updating an entry of a node mapping table based on the identification information, wherein the entry of the node mapping table maps the internal IP address of the network gateway device with an external IP address associated with the network gateway device that is routable within the WAN, wherein the external IP address is either a public IP address of the network gateway device or a public IP address of an externally routable network device behind which the network gateway device is located, wherein the node mapping table includes a first entry associated with the first network gateway device and a second entry associated with the second network gateway device, wherein the first entry maps the first public IP address of the first network gateway device with the first internal IP address of the first network gateway device, and wherein the second entry maps the first public IP address of the first network gateway device with the second internal IP address of the second network gateway device, such that the host device does not need to know whether any of the first and second network gateway devices is behind another network gateway device when the host device communicates with any of the first and second network gateway devices;

preparing a second IP packet that includes the internal IP address of the network gateway device, encapsulated within a second UDP message, wherein the second IP packet is prepared by the host message handling program;

providing the second IP packet to a tun device of the host device for network transport to transmit the second UDP message to the network gateway device based on the external IP address associated with the network gateway device via the respective persistent network connection over the WAN, wherein the network gateway device is to decapsulate the second UDP message to reveal the second IP packet.

13. A host system for communication using a user datagram protocol (UDP), the system comprising:
a server_tun processor that receives a UDP message from a network gateway device, the network gateway device being one of a plurality of network gateway devices managed by the host system over a wide area network (WAN), wherein the host system provides access to management tools for the network gateway devices, wherein the network gateway devices are network traffic devices within local area networks (LANs) that provide a gateway for their respective LANs to the WAN, wherein the host system maintains a persistent network connection with each of the network gateway devices to send network configuration data for configuring the respective network gateway devices and to receive operational statistics from the respective network gateway devices, wherein the persistent network connection includes a virtual private network (VPN) tunnel to exchange the network configuration data and operational statistics encapsulated therein, wherein the network gateway devices and the host system each have an internal Internet protocol (IP) address that is a private address from within an IP address range used for the persistent network connections over the WAN, wherein the network gateway devices include a first network gateway device having a first public IP address that is publicly routable within the WAN and a first internal IP address for communicating with the host device via a first VPN tunnel, wherein the network gateway devices include a second network gateway device that is behind the first network gateway device, the second network gateway device having a second internal IP address for communicating with the host device via a second VPN tunnel;

an mtunnel-server processor that detects message information in the received UDP message that verifies the received UDP message is a management message and that determines if the received UDP message is a data type message, wherein the mtunnel-server processor extracts an IP packet of the received UDP message in response to determining that the received UDP message is a data type message, the IP packet comprising the internal IP address of the network gateway device, and locates identification information in the received UDP message that identifies the internal IP address of the network gateway device and inserting or updating an entry of a node mapping table based on the identification information, wherein the entry of the node mapping table maps the internal IP address of the network gateway device with an external IP address associated with the network gateway device that is routable within the WAN, wherein the external IP address is either a public IP address of the network gateway device or a public IP address of an externally routable network device behind which the network gateway device is located, wherein the node mapping table includes a first entry associated with the first network gateway device and a second entry associated with the second network gateway device, wherein the first entry maps the first public IP address of the first network gateway device with the first internal IP address of the first network gateway device, and wherein the second entry maps the first public IP address of the first network gateway device with the second internal IP address of the second network gateway device, such that the host device does not need to know whether any of the first and second network gateway devices is behind another network gateway device when the host device communicates with any of the first and second network gateway devices.

14. The host system as defined in claim 13, wherein the mtunnel-server processor prepares a second IP packet, wherein the second IP packet includes the internal IP address of the network gateway device, encapsulated within a second UDP message, wherein the mtunnel-server processor transmits the second UDP message to the network gateway device based on the external IP address associated with the network gateway device via the respective persistent network connection over the WAN, wherein the network gateway device is to decapsulate the second UDP message to reveal the second IP packet.

15. The host system as defined in claim 14, wherein the mtunnel-server processor prepares the second IP packet by providing the second IP packet to a host message handling program and processing the second IP packet at a tun device of the host system for network transport, wherein the tun device is a virtual network device operating as a bridge between an application running at the host system and a network stack of an operating system of the host system, wherein the tun device is configured to process network messages that are addressed based on the internal IP address of the host system.

16. The host system as defined in claim 13, wherein the persistent network connection comprises a virtual private network (VPN) tunnel that was automatically established between the network gateway device and the host device when the network gateway device booted up and logged onto the host device, and wherein the received UDP message was received via the VPN tunnel from the network gateway device.

17. The host system as defined in claim 13, wherein the network configuration data comprises at least one of firmware upgrades, reconfiguration of settings, and executable scripts to the network gateway device.

18. The host system as defined in claim 13, wherein in detecting message information in the received UDP message, the mtunnel-server processor is to:
    extract an authentication secret embedded within the received UDP message, and
    authenticate the received UDP message by matching the extracted authentication secret with a predetermined password uniquely identifying an owner of the network gateway devices, wherein the received UDP message is verified if the authentication secret matches the predetermined password.

19. The host system as defined in claim 13, wherein the internal IP address of the network gateway device was generated based on a media control address (MAC) of the network gateway device.

20. The host system as defined in claim 13, wherein the server_tun processor receives the UDP message by processing the received UDP message and providing the received UDP message to the mtunnel-server processor, wherein the tun device is a virtual network device operating as a bridge between an application running at the host system and a network stack of an operating system of the host system, wherein the tun device is configured to process network messages that are addressed based on the internal IP address of the host system.

21. A non-transitory machine-readable medium having instructions stored therein, which when executed by a processor, cause the processor to perform a method of operating a host device for communication using a user datagram protocol (UDP), the method comprising:
    receiving a UDP message from a network gateway at the host device, the network gateway device being one of a plurality of network gateway devices managed by the host device over a wide area network (WAN), wherein the host device provides access to management tools for the network gateway devices, wherein the network gateway devices are network traffic devices within local area networks (LANs) that provide a gateway for their respective LANs to the WAN, wherein the host device maintains a persistent network connection with each of the network gateway devices to send network configuration data for configuring the respective network gateway devices and to receive operational statistics from the respective network gateway devices, wherein the persistent network connection includes a virtual private network (VPN) tunnel to exchange the network configuration data and operational statistics encapsulated therein, wherein the network gateway devices and the host device each have an internal Internet protocol (IP) address that is a private address from within an IP address range used for the persistent network connections over the WAN, wherein the network gateway devices include a first network gateway device having a first public IP address that is publicly routable within the WAN and a first internal IP address for communicating with the host device via a first VPN tunnel, wherein the network gateway devices include a second network gateway device that is behind the first network gateway device, the second network gateway device having a second internal IP address for communicating with the host device via a second VPN tunnel;

detecting message information in the received UDP message that verifies it is a management message;

determining if the received UDP message is a data type message;

extracting an IP packet encapsulated within the received UDP message in response to determining that the received UDP message is a data type message, the IP packet comprising the internal IP address of the gateway device; and locating identification information in the received UDP message that identifies the internal IP address of the network gateway device and inserting or updating an entry of a node mapping table based on the identification information, wherein the entry of the node mapping table maps the internal IP address of the network gateway device with an external IP address associated with the network gateway device that is routable within the WAN, wherein the external IP address is either a public IP address of the network gateway device or a public IP address of an externally routable network device behind which the network gateway device is located, wherein the node mapping table includes a first entry associated with the first network gateway device and a second entry associated with the second network gateway device, wherein the first entry maps the first public IP address of the first network gateway device with the first internal IP address of the first network gateway device, and wherein the second entry maps the first public IP address of the first network gateway device with the second internal IP address of the second network gateway device, such that the host device does not need to know whether any of the first and second network gateway devices is behind another network gateway device when the host device communicates with any of the first and second network gateway devices.

22. The non-transitory machine-readable medium as defined in claim 21, wherein the method further comprises:

preparing a second IP packet, wherein the second IP packet includes the internal IP address of the network gateway device, encapsulated within a second UDP message; and transmitting the second UDP message to the network gateway device based on the external IP address associated with the network gateway device via the respective persistent network connection over the WAN, wherein the network gateway device is to decapsulate the second UDP message to reveal the second IP packet.

23. The non-transitory machine-readable medium as defined in claim 22, wherein the second IP packet is prepared by a host message handling program and processed at a tun device of the host device for network transport, wherein the tun device is a virtual network device operating as a bridge between an application running at the host device and a network stack of an operating system of the host device, wherein the tun device is configured to process network messages that are addressed based on the internal IP address of the host device.

24. The non-transitory machine-readable medium as defined in claim 21, wherein the persistent network connection comprises a virtual private network (VPN) tunnel that was automatically established between the network gateway device and the host device when the network gateway device booted up and logged onto the host device, and wherein the received UDP message was received via the VPN tunnel from the network gateway device.

25. The non-transitory machine-readable medium as defined in claim 21, wherein the network configuration data comprises at least one of firmware upgrades, reconfiguration of settings, and executable scripts to the network gateway device.

26. The non-transitory machine-readable medium as defined in claim 21, wherein detecting message information in the received UDP message comprises:

extracting an authentication secret embedded within the received UDP message; and authenticating the received UDP message by matching the extracted authentication secret with a predetermined password uniquely identifying an owner of the network gateway devices, wherein the received UDP message is verified if the authentication secret matches the predetermined password.

27. The non-transitory machine-readable medium as defined in claim 21, wherein the internal IP address of the network gateway device was generated based on a media control address (MAC) of the network gateway device.

28. The non-transitory machine-readable medium as defined in claim 21, wherein receiving the UDP message comprises processing the received UDP message at a tun device of the host device and providing the received UDP message to a host message handling program, wherein the tun device is a virtual network device operating as a bridge between an application running at the host device and a network stack of an operating system of the host device, wherein the tun device is configured to process network messages that are addressed based on the internal IP address of the host device.

29. The non-transitory machine-readable medium as defined in claim 21, wherein the method further comprises:

receiving a second UDP message from a network traffic device via the network gateway device, the network traffic device being one of a plurality of network traffic devices on the LANs behind the plurality of network gateway devices, wherein the network traffic devices provide to a plurality of client nodes access to the gateway devices in order to reach the WAN, wherein each of the network traffic device is assigned with an internal IP address within the IP address range used for the persistent network connections over the WAN; and extracting and storing at the host device operational statistics of the network traffic device from the second UDP message.

30. The non-transitory machine-readable medium as defined in claim 29, wherein each of the network traffic devices maintains a persistent network connection with the host device using the respective internal IP addresses to receive configuration data from the host device and to send operational statistics to the host device.

31. The non-transitory machine-readable medium as defined in claim 30, wherein one or more of the network traffic devices behind the network gateway device are wireless access points communicating with each other, forming a mesh wireless network.

* * * * *